United States Patent
Taylor et al.

(10) Patent No.: US 6,337,625 B1
(45) Date of Patent: Jan. 8, 2002

(54) INTRUSION DETECTION PROCESS AND DEVICE

(75) Inventors: Michael Taylor, Warwickshire; Vincent Garvey, Gloucestershire; Scott Jackson, Leicestershire; Omar Meradi, Bromsgrove, all of (GB)

(73) Assignee: Valeo Service Limited, Birmingham (GB)

(*) Notice: Subject to any disclaimer, the term of this patent is extended or adjusted under 35 U.S.C. 154(b) by 0 days.

(21) Appl. No.: 09/531,110

(22) Filed: Mar. 17, 2000

(30) Foreign Application Priority Data

Mar. 17, 1999 (GB) .............................. 9906174
Apr. 6, 1999 (GB) .............................. 9907804

(51) Int. Cl.[7] .............................. G08G 13/00
(52) U.S. Cl. .............................. 340/541; 340/552
(58) Field of Search .............................. 340/541, 552, 340/426, 554, 553, 531, 425.5, 545.2, 545.3

(56) References Cited

U.S. PATENT DOCUMENTS

| | | | | |
|---|---|---|---|---|
| 3,761,908 A | * | 9/1973 | Gehman | 340/258 R |
| 4,103,293 A | * | 7/1978 | La Forge, Jr. | 340/552 |
| 4,213,196 A | | 7/1980 | Kondo | 367/94 |
| 5,134,386 A | * | 7/1992 | Swanic | 340/541 |
| 5,914,655 A | * | 6/1999 | Clifton et al. | 340/541 |
| 6,057,760 A | * | 5/2000 | Dauphin | 340/552 |
| 6,081,193 A | * | 6/2000 | Trucchi et al. | 340/541 |

FOREIGN PATENT DOCUMENTS

GB     1 600 430     10/1981

OTHER PUBLICATIONS

United Kingdom Patent Office Search Report dated Jun. 8, 1999.

* cited by examiner

Primary Examiner—John Tweel, Jr.
(74) Attorney, Agent, or Firm—Morgan & Finnegan, L.L.P.

(57) ABSTRACT

The invention relates to an intrusion detection process for detecting an intrusion within a space, in which at least two acoustic or electromagnetic signals are emitted at different frequencies ($f_1, f_2, \ldots f_n$) inside said space; at a point inside said space, a signal is received that is the combination of the signals emitted and reflected in said space; the characteristics of the demodulated signals of different frequencies are compared to establish the presence or absence of an intrusion; an intrusion signal is generated when the presence of an intruder is confirmed. The invention also proposes an intrusion detection device implementing the process according to the invention.

31 Claims, 6 Drawing Sheets

INTRUSION DETECTION PROCESS AND DEVICE

BACKGROUND OF THE INVENTION

The invention relates to an intrusion detection process by emission and reception of waves in a space, such as the space defined by the passenger compartment of an automobile vehicle or a room or compartment of a building.

The invention also includes an intrusion detection device that implements the process according to the invention.

DESCRIPTION OF THE PRIOR ART

Known vehicle intrusion detection systems are normally activated each time the vehicle is locked. The locking is achieved by means known to professionals of the art, for example by radio means, or a key or a classic mechanical switch. Once the intrusion detection system is activated, it monitors the space in order to detect a possible intrusion. If this detection meets certain criteria, the system then sets off an alarm, for example an audible siren or horn. The system can be inhibited by unlocking, or any other means, to give the owner access to the vehicle.

Prior-art intrusion detection techniques are generally based on the emission of acoustic waves (for example at ultrasound frequencies) or electromagnetic waves (for example radar) and the system functions by exploiting the Doppler effect. These systems include a transmitter which, when activated, emits a wave in the form of a single-frequency signal filling the inside of the vehicle. A receiver detects any frequency shift due to the Doppler effect of the wave reflected inside the vehicle. The characteristics of the signal received are analyzed and compared with one or more reference values. This frequency shift is characteristic of the reflection of the emitted signal from a moving object, which probably indicates an intrusion. The system then triggers an alarm.

However, these intrusion detection techniques do not completely avoid the risk of false alarms. In particular, disturbances such as sound waves, shocks on the roof or windows of the vehicle, etc. can cause modulation of the emitted wave. This modulated wave, after processing and analysis by the receiver can be incorrectly interpreted as an intrusion, since the characteristics of the modulated wave may be identical to those of the wave reflected from a moving object inside the vehicle.

Wave-generating disturbances other than those associated with an intruder may therefore result in modulation of the acoustic waves inside the vehicle. This modulation, after analysis, is interpreted as an intrusion and an alarm is set off. Such false alarms are extremely undesirable and a considerable nuisance.

In order to reduce this risk of false alarms, such a system could be made less sensitive in order to ignore signals presumed to have been caused by anything other than the actual movement of an object. However, this compromise between sufficient sensitivity to detect a movement and desensitization to ignore sources of parasitic interference is difficult to achieve and therefore unsatisfactory.

It is therefore desirable to design an intrusion detection system that is sensitive to intrusions yet able to avoid false alarms caused by non-intrusion disturbances.

SUMMARY OF THE INVENTION

The object of the present invention is therefore to propose an automobile vehicle intrusion detection system making use of emission and reception of acoustic or electromagnetic waves, but which overcomes the various drawbacks of prior-art systems.

For this purpose, the invention proposes an intrusion detection process for detecting an intrusion within a space, in which:

at least two acoustic or electromagnetic signals are emitted at different frequencies ($f_1, f_2, \ldots f_n$) inside said space;

at a point inside said space, a signal is received that is the combination of the signals emitted and reflected in said space;

the characteristics of the demodulated signals of different frequencies are compared to establish the presence or absence of an intrusion;

an intrusion signal is generated when the presence of an intruder is confirmed.

The process is advantageously completed by the following characteristics that may be taken one at a time or in their technically possible combinations:

the characteristics of the demodulated signals of different frequencies are the frequency shift, the amplitude, the phase or the duration, and the number of revolutions and the perimeter of the demodulation;

the presence of an intruder is established when the frequency shift of the demodulated signals, for each of the carrier frequencies, is different;

the demodulator used to demodulate the signals received is an IQ demodulator;

the decision on the presence or absence of an intruder is based on a comparison of some or all of the characteristics of the demodulated signals of different frequencies between themselves and/or relative to a threshold;

the decision on the presence or absence of an intruder, after comparison of some or all of the characteristics of the demodulated signals of different frequencies, is based on the relative number of "positive" and "negative" comparisons;

the forward and/or rearward direction of movement and the speed of the moving object in said space can be determined;

one or more frequencies of the emitted signals is a harmonic frequency of one of the other frequencies;

one or more frequencies of the emitted signals is an ultrasound or electromagnetic frequency;

the process includes an initial stage of self-configuration of the system;

the emission and/or reception of the signals is simultaneous or alternating;

the emission and/or of reception is performed by a transducer that emits and/or receives signals at different frequencies;

the emission and reception steps are performed by a single transducer that emits and receives signals at different frequencies either simultaneously or alternating.

The invention also proposes a device that implements this process. This device includes:

a transmitter that can emit at least two acoustic or electromagnetic signals at different frequencies;

a receiver that receives an acoustic or electromagnetic signal that is the combination of the signals emitted and reflected in said space;

means of processing and comparing the characteristics of the demodulated signals of different frequencies in order to generate an intrusion signal based on this comparison.

The device offers numerous advantageous characteristics:

it includes adding and/or amplification means to add and/or amplify the acoustic or electromagnetic signals of different frequency before emission;

said processing means include filtering and/or amplification means to isolate the characteristics of the demodulated signals of different frequencies;

said transmitter and/or receiver is a transducer that emits and/or receives signals at different frequencies simultaneously, sequentially, alternately or separately.

Other advantageous characteristics of the device according to the invention relate to an analysis involving several cumulative criteria such as the amplitude, phase, frequency and frequency shift of the detected signal.

The general principle applied by the system to detect an intrusion is to transmit signals in said space and analyze the resultant signals after reflection in this space. A difference between the resultant and original signals meeting certain criteria is taken as an indication of intrusion. Said signals, preferably acoustic, are emitted at different frequencies and the signals resulting from these emissions are examined. One of these frequencies can be a harmonic frequency of one of the other frequencies. One or more of the frequencies can be an ultrasound frequency, but other frequencies can be used.

In this manner, the proposed system is able to distinguish false alarms from actual intrusions by using two or more frequencies:

in the event of an intrusion, revealed by the presence of a moving object in said space, frequency shifts caused by the intruder are observed, and these frequency shifts are different (owing to the Doppler effect) for each of the carrier frequencies;

in the case of a disturbance due to "noise" (thermal shock, sound noise, impacts, etc.), the modulation of the acoustic waves inside said space is identical at each of the carrier frequencies.

BRIEF DESCRIPTION OF THE DRAWINGS

Other characteristics and advantages of the invention will appear on reading the claims and the detailed description below of a preferred embodiment with reference to the attached drawings of which:

DETAILED DESCRIPTION OF A PREFERRED EMBODIMENT

Figure 1A:
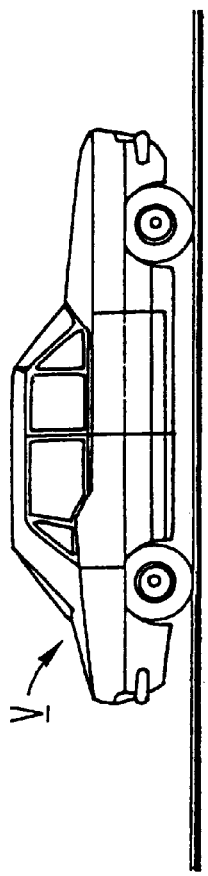
FIG. 1 is a diagram illustrating the principle of prior-art intrusion detection systems.
Figure 1C:
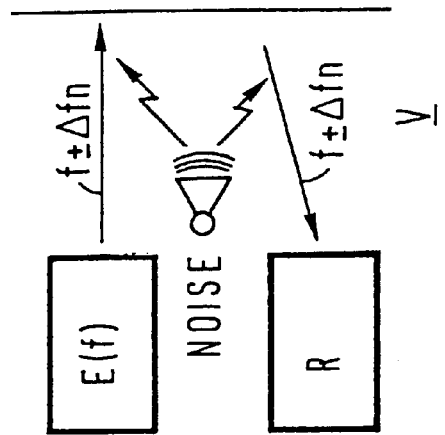
Figure 1B:
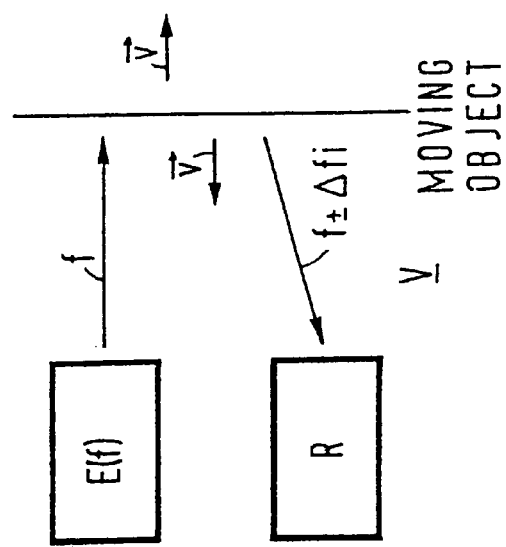

FIG. 1 presents the intrusion detection principle used in the prior art, applied to an automobile vehicle. An acoustic signal of frequency f is emitted inside a vehicle V by a transmitter E. This acoustic signal propagates inside the passenger compartment and is then received, with its reflected components, at a point inside the vehicle by a receiver R. It is analyzed to determine the presence or absence of an intruder.

In the event of intrusion, the emitted signal is reflected on a moving object (speed v) and a frequency shift $\Delta f_i$ of the frequency f is observed due to the presence of this moving object.

In the case of a disturbance due to external or internal "noise" (thermal shocks, sound noise, mechanical impacts, etc.), we observe a modulation $\Delta f_n$ of the frequency f.

In many cases, the frequency shift $\Delta f_i$ can be equal to the frequency modulation $\Delta f_n$, so the detection system is unable to differentiate clearly between intrusion and noise.

Figure 2A:
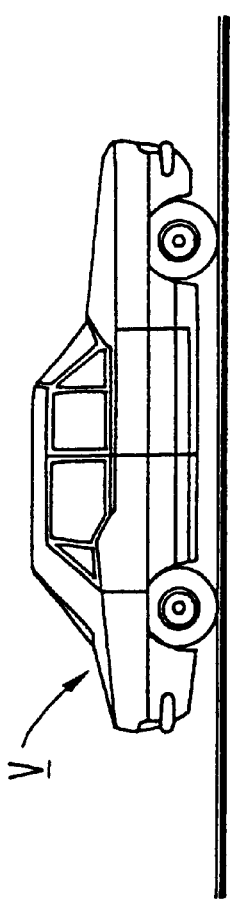
FIG. 2 is a simplified diagram of the intrusion detection principle according to the invention.
Figure 2C:
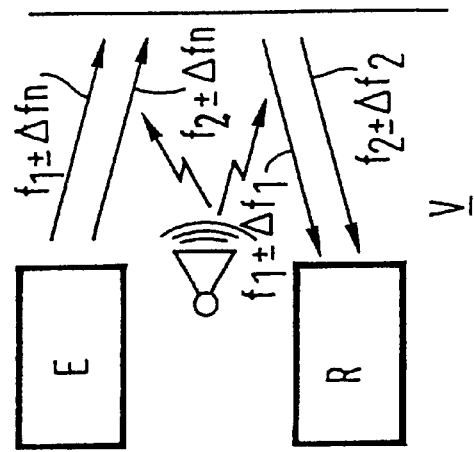
Figure 2B:
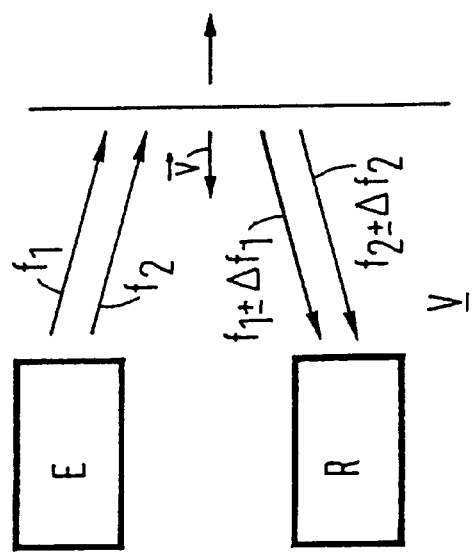

FIG. 2 illustrates the operating principle of the intrusion detection system according to the invention, in an embodiment for an automobile vehicle. Inside a vehicle V, during activation of the system, a transmitter E emits at least two acoustic waves at different frequencies $f_1$, $f_2$. These waves are emitted in the vehicle passenger compartment and a receiver R receives, at a point inside the vehicle, a signal that is the combination of the waves emitted and reflected in said vehicle.

In the event of an intrusion, frequency shifts of $\Delta f_1$ for the frequency $f_1$ and $\Delta f_2$ for the frequency $f_2$ are observed due to the presence of a moving object. These two frequency shifts are different since they obey the Doppler effect principle, well known to professionals of the art.

In the case of a disturbance by "noise" (thermal shock, audible noise, mechanical impacts, etc.), a modulation $\Delta f_n$ of the frequencies $f_1$ and $f_2$ is observed that is identical for both frequencies.

It is therefore possible to distinguish clearly an intrusion from noise.

The acoustic signals are emitted at different frequencies. One of these frequencies can be a harmonic frequency of one of the other frequencies. One or more of the frequencies can be ultrasonic, but other frequencies could be employed.

When the intrusion detection system is used in a vehicle, once the system is activated it is possible to make it perform a "self-configuration", which consists in analyzing the response of the space in normal conditions. This basic response then serves as a baseline for the comparison with signals received later with the aim of detecting intrusions. This self-configuration is important to assure optimal reliability of the system by enabling it to adapt at each activation to the interior layout of the vehicle, which is likely to be different each time, for example following a change of the positions of the seats or objects left in the vehicle. However, the self-configuration is not indispensable, since a constant baseline could be memorized. Once the self-configuration procedure is completed, the system enters its normal monitoring mode until an intrusion is detected (in which case it triggers an alarm then returns to monitoring mode), or is deactivated by the user.

The operation of the device implementing the intrusion detection system according to the invention will now be described.

Figure 3:
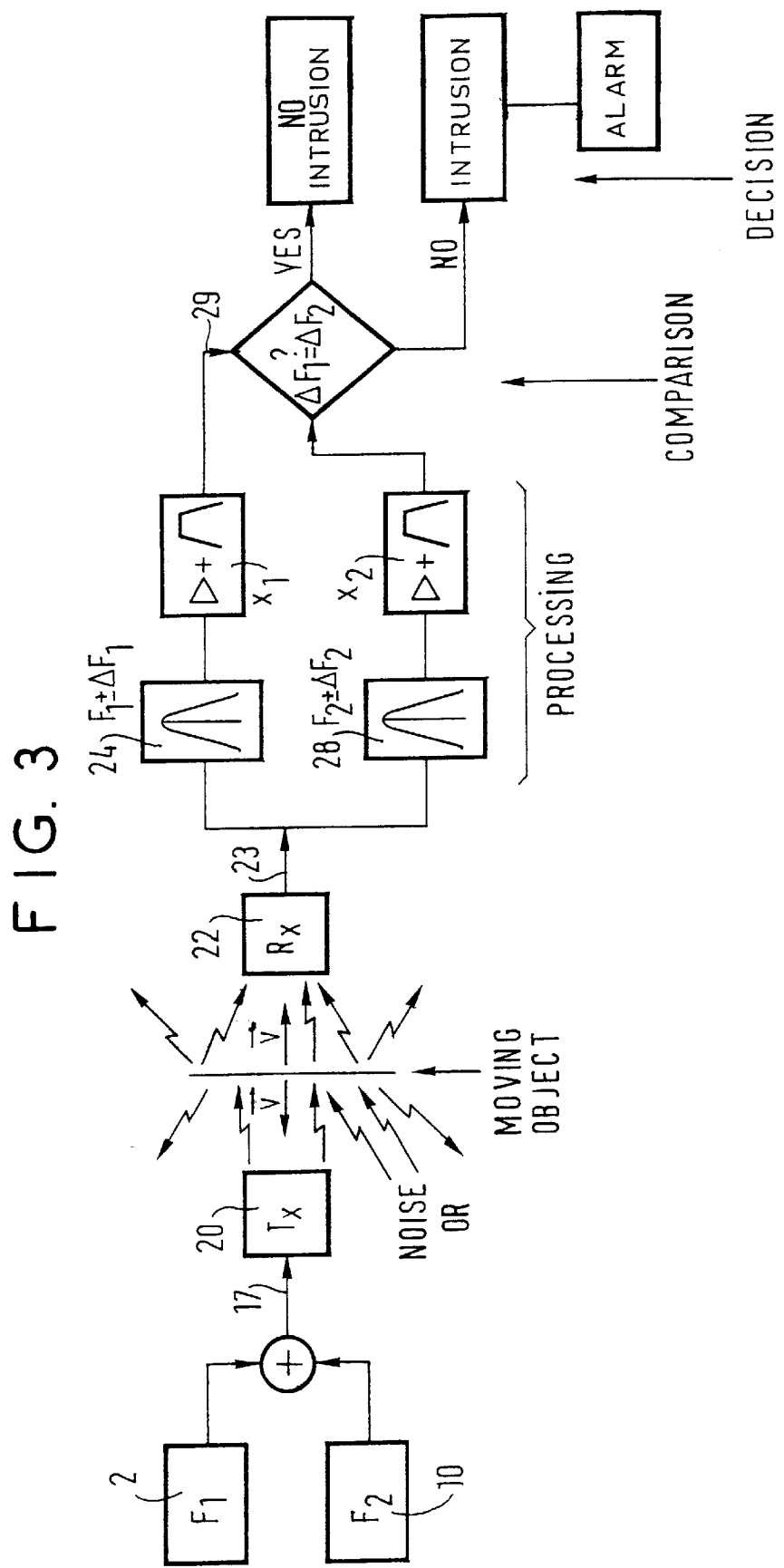
FIG. 3 is a highly simplified representation of an intrusion detection device according to an embodiment of the invention.

FIG. 3 presents a simplified device implementing the intrusion detection system according to the invention. This device comprises two signal generators 2 and 10 generating signals at frequencies $f_1$ and $f_2$. The generated signals are acoustic signals centered on ultrasonic frequencies. The two frequencies $f_1$ and $f_2$ are added in an adder/amplifier 18. The signal 17 resulting from this addition/amplification is then emitted in the vehicle passenger compartment by the ultrasonic transmitter 20 that emits it in the form of acoustic signal.

The resultant signal 17 is a so-called "dual-frequency signal" which is transmitted and reflected on all parts of the vehicle's passenger compartment and on a moving object (speed v), if there is one. A receiver 22 receives, at a point inside the vehicle, a signal 23 that is the combination of the emitted and reflected signals. A separation of the components of the signal 23 and a demodulation is performed using bandpass filters 24, 28 centered on the carrier frequencies $f_1$ or $f_2$. These filters are followed by an amplifier and a demodulation filter (low frequency) X1, X2. This separation enables the frequency shifts $\Delta f_1$, $\Delta f_2$ to be identified for each of the carrier frequencies $f_1$, $f_2$.

A comparator 29 compares the frequency shifts $\Delta f_1$ and $\Delta f_2$; the result of this comparison enables a decision on the presence or absence of an intruder.

If $\Delta f_1$ is equal to $\Delta f_2$, the frequency shift is due to a modulation of the frequencies $f_1$ and $f_2$. This modulation is identical for the two frequencies and is due to a disturbance such as "noise" (thermal shocks, sound noise, mechanical impacts, etc.), and there is therefore no intrusion.

If $\Delta f_1$ is different from $\Delta f_2$, according to the Doppler effect the signal must be being reflected from a moving object, which indicates the presence of an intruder.

It is also possible to transmit the two signals $f_1$ and $f_2$ separately, each signal having its own transmitter.

When the number of signals is greater than two ($f_1$, $f_2$, . . . $f_n$), the decision on the presence or absence of an intruder, after comparison of some or all of the characteristics of the demodulated signals of different frequencies—and notably of the frequency shifts—is based on the relative number of "positive" and "negative" comparisons.

In the embodiment described here, the signals ($f_1$, $f_2$, . . . $f_n$) are acoustic waves (for example ultrasonic), but it is possible to implement the invention using electromagnetic waves, such as radar.

Figure 4:
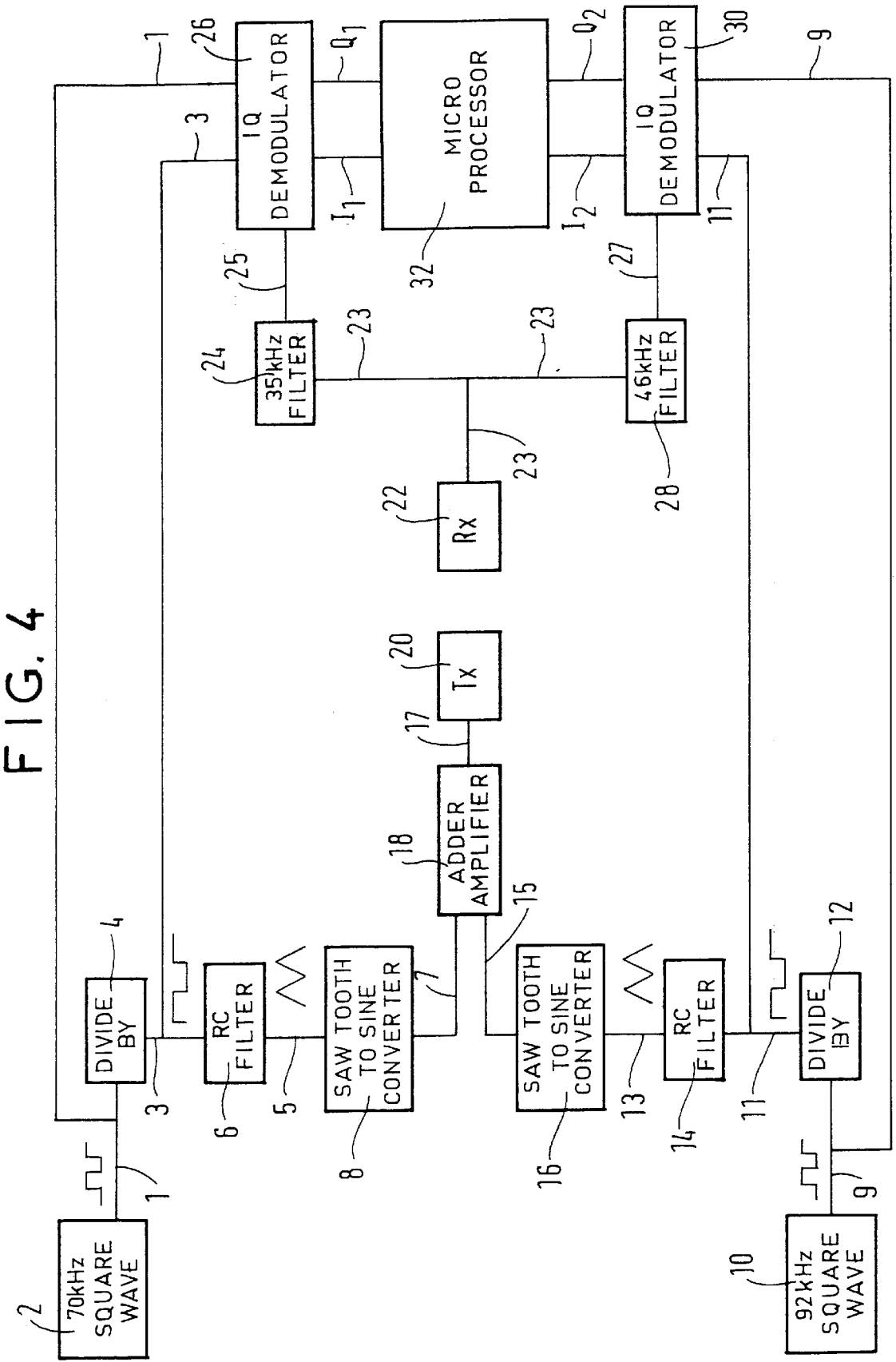
FIG. 4 is a detailed block diagram of an intrusion detection device corresponding to the embodiment in FIG. 3.

FIG. 4 illustrates a more elaborate embodiment of the vehicle intrusion detection device according to of the invention. In this case the analysis is based on several cumulative criteria such as the amplitude, durations and frequency of the detected signal.

This device includes a first signal generator 2 that generates a signal 1 at a first frequency $f_1$, for example 70 kHz. The signal 1 has a square wave profile.

This signal 1 is fed to two other components: the first is a first divide-by-two unit 4 that halves the frequency of the signal 1, so it becomes a square wave signal 3 of frequency f3, where $f_3=(f_1/2)$ and is for example 35 kHz. The purpose of this halving of the frequency $f_1$ is to provide a signal at frequency $f_3$ used for sampling a reflected signal, as described later. The sampling is carried out by a first IQ demodulator 26, whose function will be described below, clocked by the signal 1.

The signal 3 of frequency $f_3$ produced by the first divider 4 is fed to two other components: a first RC filter 6 that converts it into a sawtooth signal 5 of frequency $f_3$, and a first IQ demodulator 26 that uses the signal as described below.

This sawtooth signal 5 produced by the first RC filter 6 feeds a first sawtooth-to-sinewave converter 8 that smoothes the signal by converting it into a sinewave signal 7 of frequency $f_3$, which provides a first input to an adder/amplifier 18.

A second input to the adder/amplifier 18 is produced in a similar manner by components similar to those described previously: a second signal generator 10 produces a signal 9 at a second frequency $f_2$, for example 92 kHz, having a square wave profile.

This signal 9 feeds two other components: a second divide-by-two unit 12 that halves the frequency of the signal 9, so it becomes a square wave signal 11 of frequency $f_4$, where $f_4=(f_2/2)$ and is for example 46 kHz. This signal 11 is used to sample a reflected signal at frequency $f_2$, as described below. The second component is a second IQ demodulator 30, whose function will be described below, synchronized by the signal providing the clock pulse.

This signal 11 of frequency $f_4$ produced by the second divider 12 is fed to two other components: a second RC filter 14 which converts it into a sawtooth signal 5 of frequency $f_4$, and a second IQ demodulator 30 which uses the signal as described below.

This sawtooth signal 13 produced by the second RC filter 14 is fed to a second sawtooth-to-sinewave converter 16 that smoothes the signal by converting it into a sinewave signal 15 of frequency $f_4$, which provides the second input to the adder/amplifier 18.

The adder/amplifier 18 adds the signals 7 and 15 to produce a resultant dual-frequency sinewave signal. The adder/amplifier 18 includes an amplifier that amplifies the resultant signal 17. This signal 17 feeds the ultrasonic transmitter 20 which emits it in the form of acoustic signal into the vehicle interior. It would be also possible to transmit two separate signals each from its own transmitter.

The transmitter 20 and the receiver 22 are located at a suitable location inside the vehicle, for example beneath the roof of the vehicle, such that the emitted signal reaches as much of the volume of the vehicle as possible.

The dual-frequency signal is radiated over a broad angle in order to reach many different surfaces within the vehicle. The signal is reflected from and between these surfaces and is then received by a receiver 22 which, in order to simplify the installation, could be placed near the transmitter 20, on condition that the receiver is not swamped by signals received directly from the transmitter without first being reflected inside the vehicle. The reflection of the surfaces modifies the resultant signals in phase and amplitude of each component ($f_3$ and $f_4$) of the dual-frequency signal, each in surface and each reflection causing a different modification. The resultant signals therefore depends on the path length from the transmitter to the reflection surface(s) and back to the receiver, and on the nature of the surfaces. The total signal received by the receiver 22 is the sum of all the different signals reflected from the different surfaces. Each component, meaning the original sinewave signals 7 and 15, is modulated by its transit through the vehicle from the transmitter(s) to the receiver(s).

In the event of intrusion into the vehicle, a new presence modifies the basic response of the space by altering the pattern of reflections, making a modification of the signals received likely. The signals received may also change due to false alarm factors, such as the small movements of the vehicle's windows due to shock waves from passing vehicles, or sources of high frequency acoustic interference outside the vehicle. The received signals are therefore analyzed with the aim of determining whether a real change from the basic state has occurred, and if so whether the change probably represents an intrusion that requires an alarm to be set off.

From the dual-frequency signal received having modulated components, the receiver 22 generates a corresponding data signal 23 which is fed to a first filter and a second filter. The first filter is a bandpass filter which filters out all components outside a certain frequency window (±10 kHz for example) around $f_3$, thus producing a data signal 25 from the modulated signal 7 of frequency $f_3$. The second filter is a bandpass filter which filters out all components outside a certain frequency window (±10 kHz for example) around $f_4$, thus producing a data signal 27 from the modulated signal 15 of frequency $f_4$. The signals 25, 27 can be amplified, if necessary.

The signal 25 of the $f_3$ data channel feeds the first IQ demodulator 26 where it is sampled at $f_1$, synchronized by the clock signal 1. Since the square wave signal 3 of frequency $f_3$ also feeds the first IQ demodulator 26, it is possible to obtain purely the modulation of the original signal $f_3$ by transformation of the signal 3 with the signal 25. This calculated signal is then demodulated to obtain a first in-phase component $I_1$, and a first quadrature component $Q_1$. These components $I_1$, and $Q_1$ can be considered respectively as the real and imaginary parts of the modulation of the signal 25. They represent a first stable vector for the vehicle interior, which means they represent the phase modulation of the first emitted sinewave signal 7, in the absence of intrusion in the vehicle. The components $I_1$ and $Q_1$ output by the first IQ demodulator 26 are fed to a microprocessor 32.

In the same manner, the signal 27 of the 46 kHz data channel feeds the second IQ demodulator 30 where it is sampled at $f_2$, synchronized by the clock signal 9. Since the square signal 11 of frequency $f_4$ also feeds the second IQ demodulator 30, it is possible to obtain purely the modulation of the original signal $f_4$ by transformation of the signal 11 with the signal 27. This calculated signal is then demodulated to obtain a second in-phase component $I_2$ and a second quadrature component $Q_2$. These components $I_2$ and $Q_2$ can be considered respectively as the real and imaginary parts of the modulation of the signal 27. They represent a second stable vector for the vehicle interior, which means they represent the phase modulation of the second emitted sinewave signal 15, in the absence of intrusion in the vehicle. The components $I_2$ and $Q_2$ output by the second IQ demodulator 30 are fed to the microprocessor 32.

Figure 6:
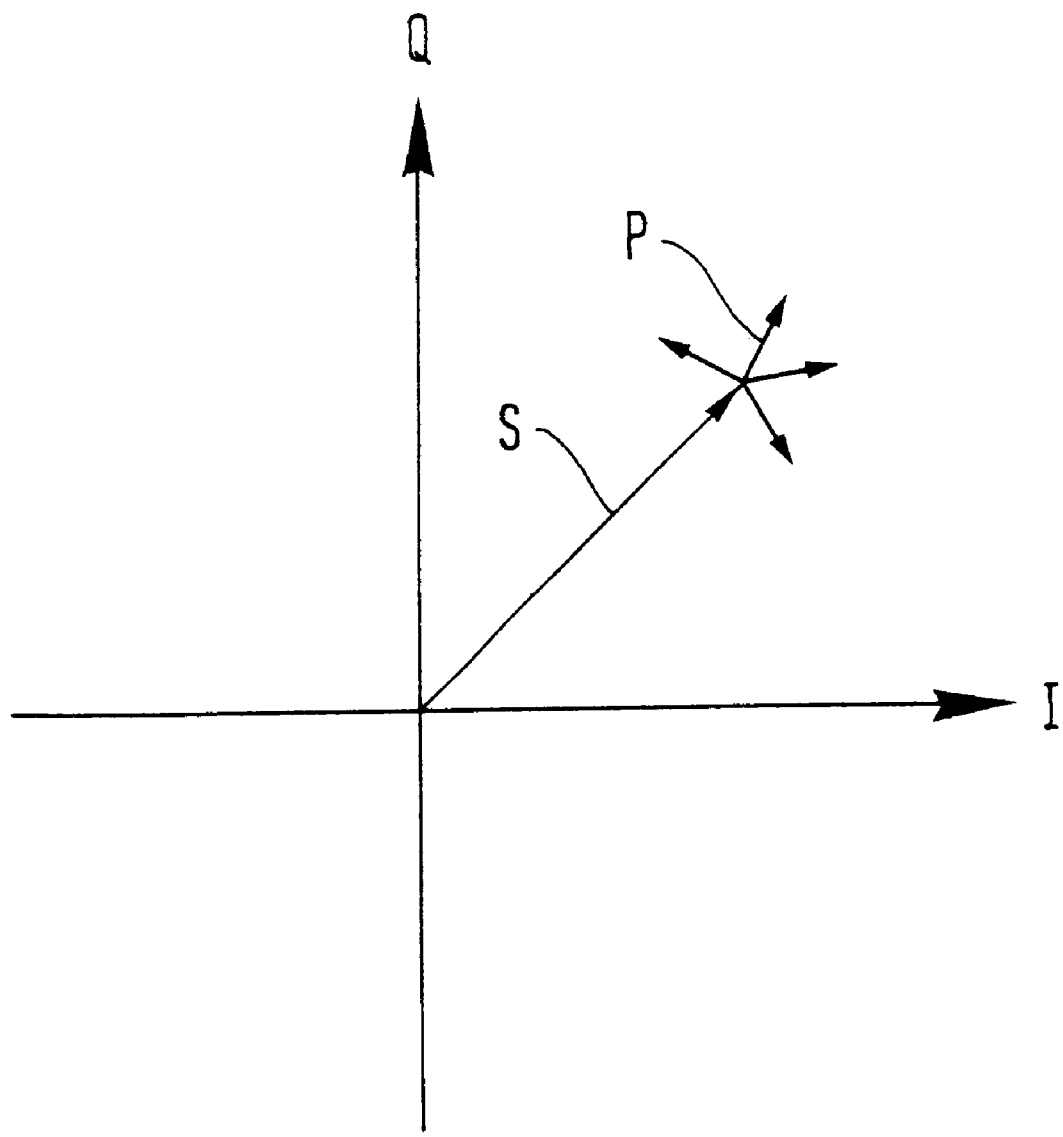
FIG. 6 illustrates the vector-based operation of the detector sub-system.

If the interior of the vehicle changes in any way, owing to the presence of an intruder or a "false alarm factor", the first and second stable vectors will have additional perturbation components. This effect is illustrated schematically in FIG. 6 that shows a stable vector S and several perturbation vectors, such as P. The function of such perturbation vectors in determining the presence of an intruder will be now described in more detail, notably with reference to the operation of the microprocessor 32.

The components 20 and 22 constituting the transmitter and receiver of the device can be transducers. Notably, the emission transducer 20 is capable of emitting simultaneously, sequentially or alternately acoustic waves at different frequencies; the reception transducer 22 is capable of receiving simultaneously, sequentially or alternately acoustic waves at different frequencies.

It is also possible to have a single transducer capable of emitting and receiving simultaneously, sequentially or alternately acoustic waves at different frequencies, which is very advantageous in terms of cost.

Figure 5:
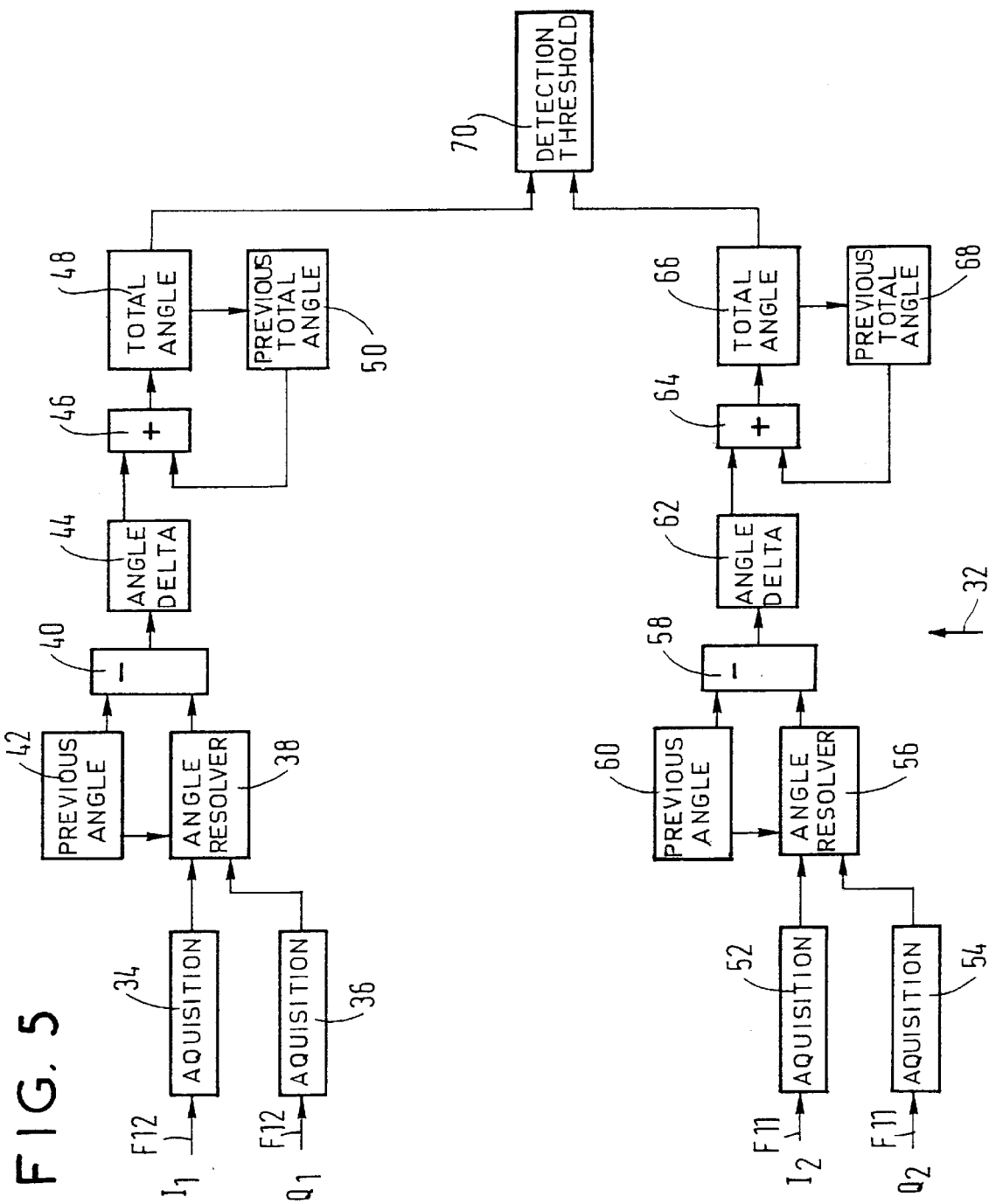
FIG. 5 is a block diagram of a software algorithm used in the microprocessor of FIG. 4.

In FIG. 5, we note that the signal $I_1$ is periodically acquired by a first acquisition unit 34 and that the signal $Q_1$ is periodically acquired by a second acquisition unit 36. In a first acquisition of the signals, a first acquired in-phase signal and a first acquired quadrature signal are fed to a first angle resolver 38. The angle resolver 38 includes a memory that stores the first acquired quadrature signal. These signals represent the stable vector for the vehicle interior, equivalent to the vector S in FIG. 6. These signals are stored during the self-configuration phase after activation of the device, during which the device waits for a stable state to be established, or calculates the average of the signals $I_1$ and $Q_1$ received over an initial period; it then stored these average values of $I_1$ and $Q_1$ in the angle resolver 38.

In monitoring mode, a pairing of an in-phase signal $I_1$ and a quadrature signal $Q_1$ is acquired periodically. These signals together represent a current vector for the vehicle interior. The reference values of the in-phase signal and the quadrature signal are read in the memory of the angle resolver 38 then subtracted from the newly acquired signals to determine the deviation vector of the new signals relative to the steady reference state. This is the equivalent of the perturbation vector P in FIG. 6. The angle resolver also determines the angular deviation in I-Q space of this deviation vector relative to the immediate previous deviation vector. A first comparator 40 calculates the angular phase difference between the deviation vector and the previous deviation vector. Next, the previous deviation vector in the "previous angle" unit 42 is replaced by the current deviation vector for use in the next cycle.

This process is repeated at the next acquisition. A new acquired in-phase signal and a new acquired quadrature signal are then stored in the memory, thus constituting a new vector for the vehicle interior. The second acquired in-phase signal and the second acquired quadrature signal are read from the memory. The comparator 40 calculates the phase difference between the second and third vectors.

In general, at each acquisition, the newly acquired in-phase and quadrature signals represent a vector for the vehicle interior. The phase difference between this vector and the previous vector (labeled "previous angle" 42 in FIG. 5) is calculated by the comparator 40. This phase difference is labeled "angular delta" 44 in FIG. 5.

Every time a phase difference is calculated, a counter is incremented by the angular delta 44. This operation is labeled 46 in FIG. 5. The counter can be thought of as a first cumulated angle 48. During the first acquisition, it is reset to zero, since this value represents the notional phase angle of the stable vector. At each of the subsequent acquisitions, the angular delta is added to the previous cumulated angle 50. In the absence of intrusion, the signals $I_1$ and $Q_1$ will be unchanged at each acquisition, which means that the previous angle 42 will be equal to each newly-acquired phase angle. This in turn means that the angular delta will be zero and the counter will not be incremented; the cumulated angle 48 remains zero.

If however, there is a disturbance inside the vehicle, the component $f_3$ of the dual-frequency acoustic signal will be reflected differently because of the disturbance, therefore the modulation of the signal cause will be different from that produced when there is no disturbance. The total modulation of the $f_3$ signal being changed, the signal 25 feeding the first IQ demodulator 26 will have a phase angle different from that of the steady signal. Consequently, the components $I_1$ and $Q_1$ change so that when an acquisition is made by the units 34, 36 and the signal is fed to the angle resolver 38, the phase angle will differ from the previous angle 42 and the angular delta 44 will no longer be zero. This means that the cumulated angle 48 will be incremented by the angular delta 44.

This process is repeated at each subsequent acquisition. Each time the angular delta 44 changes and will be added to the cumulated angle 48. If the origin of the disturbance is something other than a genuine intrusion, for example an object falling inside the passenger compartment, it is likely that the changes in the angular delta 44 will oscillate in sign, in which case the value of cumulated angle 48 will oscillate around zero. If however the disturbance is due to an intruder, the angular delta will tend to increase progressively with the same sign as the intruder moves into the vehicle. However, there are certain types of noise that could also cause an increase in the same direction of the angular delta, for example a low frequency noise originating from outside the vehicle. In some prior-art systems this may trigger a false alarm.

One advantage of this embodiment of the present invention is that the same process of acquisition and calculation of the angular delta is applied for the second component $f_4$ of the dual-frequency acoustic signal, as shown in FIG. 5. For this purpose, third and fourth acquisition units 52, 54 are provided that receive signals acquired and whose output signals are fed to a second angle resolver 56 that includes a memory 60 used to store the previous angle. A second comparator 58 is provided to calculate the angular delta 62 and add it to the previous angle 68 in order to calculate a second cumulated angle 66, this cumulation process being labeled 64 in FIG. 5.

After each acquisition, the first cumulated angle 48 and the second cumulated angle 66 are fed to a threshold detection unit 70 whose function is to determine whether or not an alarm should be set off, this decision being subject to two criteria. The first criterion, which represents an advantage over prior-art systems, is that the first and second cumulated angles must be related by a predetermined relation. If a real intrusion occurs, the angular change of the reflected acoustic signal of the first component at $f_3$ will normally differ from that of the second component at $f_4$, owing to their different wavelengths. On the other hand, if a disturbance signal is present in the vehicle, such as a low frequency sound wave from outside the vehicle, the two acoustic components should undergo the same modulation, and the angular deltas 44, 62 and the cumulated angles 48, 66 will be the same. The first criterion can therefore be that the first and second angles differ by more than a threshold value, for example 1, 2 or 3 revolutions.

The second criterion requires that the intruder move over a certain distance, for example 10 cm, when entering the vehicle. This assures a number of revolutions of each angular delta and will therefore be verified by comparing each value of the cumulated angle with a predetermined threshold value stored in the threshold detection unit 70. The criterion provides a second means of protection against the risk of a false alarm triggered by small movements such as oscillating movements or the movements of an insect.

It is also possible, on the basis of these criteria, to determine the forward or rearward direction of movement and the speed of the moving object in the vehicle's passenger compartment.

If both criteria are satisfied, in other words the angles 48 and 66 both exceed the respective thresholds and differ by more than another threshold, then an intrusion signal is triggered, to set of a warning siren for example. The thresholds can be stored in a memory accessible to the threshold detection unit 70 which contains the means necessary to process its inputs and take the decision to trigger the alarm. The thresholds could be factory-set, or set by the user in order to allow some control over the sensitivity of the system. The thresholds could also be dynamically adjustable by the device itself, in which case one or more of the thresholds will be increased automatically to cope with particularly problematic environments, for example the proximity of a busy main road where shocks caused by passing vehicles frequently cause false alarms if the initial threshold settings are maintained.

The present invention provides two further safeguards against false alarms. The first is that a "zero window" threshold is provided for the values of $I_1$, $Q_1$, $I_2$ and $Q_2$. Once a steady vector has been calculated, if the subsequent values are less than certain threshold values, the calculation of the angular delta and the subsequent computation are not carried out. This prevents a cumulation of the effects of very small disturbance values in the cumulated angles 48, 66. Here again, these thresholds can be adjustable as described above.

The second safeguard is that the following rule is imposed: if an increase of the angular delta 44, 62 is detected, the next increase must occur within a certain number of acquisitions, otherwise the cumulated angle 48, 66 is reset to zero. This avoids the possibility of cumulating small non-intruder disturbances which could trigger an alarm after a certain time. One way to achieve this is by decrementing at a regular intervals the value of the cumulated angle of each channel so that they become zero after a certain time.

The frequencies of the two channels preferably differ by more than 5 kHz, and a difference of 10 kHz is even better.

The devices described previously implement the process according to the invention by generating two signals of different frequency. A generalization with more than two signals of different frequency is also possible. When the number of signals is greater than two, the decision on the presence of an intrusion, made after comparison of frequency shifts or other characteristics, is based on the relative number of "positive" and "negative" comparisons.

The preferred embodiment of the intrusion detection process described previously relates to an automobile vehicle passenger compartment. However, the invention is also applicable to any enclosed space, such as a vehicle engine compartment or the rooms or other compartments of a building.

What is claimed is:

1. A process for detecting an intrusion within a space, comprising the steps of:
   emitting at least two acoustic or electromagnetic signals at different frequencies ($f_1$, $f_2$, ... $f_n$) inside said space;
   receiving at a point inside said space, a signal that is the combination of the signals emitted and signals reflected in said space;
   comparing characteristics of the demodulated signals of different frequencies to establish a presence or absence of an intrusion;
   generating an intrusion signal when the presence of an intruder is confirmed.

2. A process according to claim 1, wherein the characteristics of the demodulated signals at different frequencies are the frequency shift, the amplitude, the phase, the duration, the number of revolutions, or the perimeter.

3. A process according to claim 2, wherein the presence of an intruder is established when the frequency shifts of the demodulated signals at the different carrier frequencies ($f_1$, $f_2$, ... $f_n$) are different.

4. A process according to claim 1, wherein an IQ demodulator is used to demodulate said received signals.

5. A process according to claim 1, wherein the establishment of the presence or absence of an intrusion is based on a comparison of some or all of said characteristics of the demodulated signals of different frequencies between themselves and/or relative to a threshold.

6. A process according to claim 1, wherein the establishment of the presence or absence of an intrusion, after comparison of some or all of said characteristics of the demodulated signals of different frequencies, is based on the relative number of "positive" and "negative" comparisons.

7. A process according to claim 1, wherein the forward and/or rearward direction of movement and the speed of the moving object constituting the intrusion in said space is determined.

8. A process according to claim 1, wherein one or more frequencies of said emitted signals is a harmonic frequency of one of the other frequencies.

9. A process according to claim 8, wherein one or more frequencies of said emitted signals is an ultrasonic frequency.

10. A process according to claim 1, which further includes an initial self-configuration stage of the system.

11. A process according to claim 1, wherein said signals are emitted and/or received simultaneously or alternately.

12. A process according to claim 1, wherein said emission and/or reception is performed by a transducer that emits and/or receives signals at different frequencies.

13. A process according to claim 1, wherein both emission and reception are performed by a single transducer that emits and receives signals at different frequencies simultaneously or alternately.

14. An intrusion detection device for detecting an intrusion within a space, comprising:
    a transmitter emitting at least two acoustic or electromagnetic signals at different frequencies;
    a receiver receiving a signal that is a combination of the emitted and reflected signals in said space;
    a processor programmed to compare one or more characteristics of the demodulated signals of different frequencies in order to generate an intrusion signal based on this comparison.

15. An intrusion detection device according to claim 14, which further comprises an amplifier to amplify said acoustic or electromagnetic signals of different frequency before their emission.

16. An intrusion detection device according to claim 14, wherein said processor includes a filter to isolate said characteristics of the demodulated signals of different frequencies.

17. An intrusion detection device according to claim 14, wherein said transmitter and/or receiver is a transducer that emits and/or receives signals at different frequencies simultaneously, sequentially or alternately.

18. An intrusion detection device according to claim 14, comprising:
    a transmitter that emits in said space a first acoustic signal at a first frequency and a second acoustic signal at a second frequency different from the first;
    a receiver that receives and demodulates a first reflected acoustic signal produced by reflection of said first acoustic signal in said space and a second reflected acoustic signal produced by reflection of said second acoustic signal in said space, to produce a first in-phase data component and a first quadrature data component for said first signal received and a second in-phase data component and a second quadrature data component for said second signal received;
    a first processor programmed to process said first in-phase and quadrature data components generating a first deviation value based on these first components, and a second processor programmed to process said second in-phase and quadrature data components generating a second deviation value based on these second components, and means of comparison of said first deviation value and second deviation value to generate an intrusion signal based on this comparison.

19. An intrusion detection device according to claim 18, comprising a memory in which is stored:
    a basic value of a first in-phase component;
    a basic value of a first quadrature component;
    a basic value of a second in-phase component;
    a basic value of a second quadrature component.

20. An intrusion detection device according to claim 19, wherein when generating said first and second deviation values, said processor can:
    access said memory to determine said base values of said first and said second in-phase and quadrature components;
    generate a first phase difference representing the difference between the first acquired in-phase component and said basic value of the first in-phase component,
    generate a first quadrature difference representing the difference between the first acquired quadrature component and said basic value of the first quadrature component
    generate a second phase difference representing the difference between the second acquired in-phase component and said basic value of the second in-phase component;
    generate a second quadrature difference representing the difference between the second acquired quadrature component and said basic value of the second quadrature component.

21. An intrusion detection device according to claim 20, wherein said memory can store said first and second previous deviation values, and wherein when generating these first and second deviation values said processing means can:
    determine a first phase angle represented by said first values of phase and quadrature difference, and generate said first deviation value by incrementing said first deviation value previously memorized by said first phase angle;
    determine a second phase angle represented by said second values of phase and quadrature difference, and generate said second deviation value by incrementing said second deviation value previously memorized by said second phase angle.

22. An intrusion detection device according to claim 21 wherein its processor can trigger the intrusion signal if said first and second deviation values exceed respectively first and second threshold values.

23. An intrusion detection device according to claim 21, wherein its processor can trigger the intrusion signal if said first and second deviation values differ by less than a third threshold value.

24. An intrusion detection device according to claim 21, wherein its processor generates said first deviation value only if said first acquired in-phase and quadrature signals fall outside predetermined windows containing respectively said base values of the first in-phase and quadrature components, and wherein its processor generates said second deviation value only if said second acquired in-phase and quadrature signals fall outside predetermined windows containing respectively said base values of said in-phase and quadrature components.

25. An intrusion detection device according to claim 21, wherein its processor can decrement periodically said first and second deviation values memorized previously.

26. An intrusion detection device according to claim 18 wherein it is implemented for the emission, reception and analysis of n acoustic signals at different frequencies.

27. An intrusion detection device according to claim 14, wherein said transmitter comprises:

- a signal generator that generates a third signal at twice said first frequency and a fourth signal at twice said second frequency;
- a divider that halves the frequencies of said third and fourth signals, this being necessary to generate said first and second acoustic signals;

and wherein said receiving can receive said third and fourth signals and use them to demodulate said first and second signals respectively.

28. An intrusion detection device according to claim 1, wherein said transmitter comprises a single acoustic transmitter for transmission of said first and second acoustic signals in said space.

29. An intrusion detection device according to claim 1, wherein said space is defined by a compartment of a vehicle.

30. An intrusion detection device according to claim 1, wherein said space is defined by a room or compartment of a building.

31. An intrusion detection device according to claim 29, wherein said base values of said first and second in-phase and quadrature components are determined and stored every time said vehicle or building compartment is closed.

* * * * *